(12) United States Patent
Kelley et al.

(10) Patent No.: US 7,055,240 B2
(45) Date of Patent: Jun. 6, 2006

(54) POSITIONING APPARATUS FOR PRECISELY LOCATING A PART OR OTHER ARTICLE

(75) Inventors: Reginald D. Kelley, Shelby Township, MI (US); Brian D. Mabee, Shelby Township, MI (US)

(73) Assignee: Easom Automation Systems, Inc., Detroit, MI (US)

( * ) Notice: Subject to any disclaimer, the term of this patent is extended or adjusted under 35 U.S.C. 154(b) by 282 days.

(21) Appl. No.: 10/680,931

(22) Filed: Oct. 8, 2003

(65) Prior Publication Data
US 2005/0076495 A1    Apr. 14, 2005

(51) Int. Cl.
B23P 21/00    (2006.01)
(52) U.S. Cl. ............ 29/787; 29/721; 29/771; 269/47; 414/785; 414/787
(58) Field of Classification Search .......... 29/787, 29/771, 721, 714, 709, 700, 703, 720; 254/134, 254/89 R; 269/47; 414/785, 787
See application file for complete search history.

(56) References Cited

U.S. PATENT DOCUMENTS

| | | | | |
|---|---|---|---|---|
| 4,589,199 A | * | 5/1986 | Ohtaki et al. ............. | 29/714 |
| 4,813,125 A | * | 3/1989 | Dacey, Jr. ................ | 29/714 |
| 4,976,026 A | * | 12/1990 | Dacey, Jr. ................ | 29/714 |
| 5,072,506 A | * | 12/1991 | Dacey, Jr. ................ | 29/464 |
| 5,778,517 A | * | 7/1998 | Amesbichler et al. ...... | 29/709 |
| 5,943,768 A | * | 8/1999 | Ray ....................... | 29/822 |
| 5,987,726 A | * | 11/1999 | Akeel ..................... | 29/407.08 |
| 6,141,861 A | * | 11/2000 | Armenoff et al. .......... | 29/712 |
| 6,378,190 B1 | * | 4/2002 | Akeel ..................... | 29/407.08 |
| 6,422,536 B1 | * | 7/2002 | Kelley et al. ............ | 254/89 R |
| 6,425,177 B1 | | 7/2002 | Akeel | |
| 6,427,321 B1 | * | 8/2002 | Fedato et al. ............ | 29/787 |

OTHER PUBLICATIONS

TUNKERS Spannsysteme, "Underbody clamp with locating pin, selflocking type for holes 20-40 mm".
General Motors Corporation, PAAS Design & Integration SOR Jun. 2001.

* cited by examiner

*Primary Examiner*—Essama Omgba
(74) *Attorney, Agent, or Firm*—Jacox, Meckstroth & Jenkins

(57) ABSTRACT

Horizontal guide rails are mounted on a base and receive linear bearings mounted on the bottom of a tower which carries vertical guide rails receiving linear bearings mounted on a vertical carriage plate. Linear bearings are mounted on the carriage plate and support a horizontal guide rail secured to a horizontal lift arm having an outer end portion supporting a precision locating pin device for a part. Separate gear belts extend around corresponding adjustable idler gears and drive gears and are clamped to the corresponding tower, carriage plate and lift arm. The drive gears are driven by corresponding drive units each including a reversible servo-controlled electric motor, a planetary gear reducer, an absolute resolver unit and an electrically actuated spring set brake. A plurality of the above apparatus are located on opposite sides of a linear part conveyor with the lift arms projecting inwardly in generally opposing relation.

20 Claims, 5 Drawing Sheets

POSITIONING APPARATUS FOR PRECISELY LOCATING A PART OR OTHER ARTICLE

BACKGROUND OF THE INVENTION

This invention relates to a programmable precision locator apparatus or unit which is commonly used along a linear conveyor for transferring or indexing parts, such as vehicle underbody panels or vehicle bodies through a series of work stations or cells along the conveyor where different operations, such as clamping and spot welding, are performed on the parts at the stations. Commonly, in manufacturing lines for motor vehicles, a plurality of programmable precision locating apparatus or units are positioned under a conveyor system. Each precision locating unit supports a horizontally and vertically adjustable locating pin and clamp device which is positioned to engage and clamp a hole within the body or body panel and then lift the body part to an elevated position where welding or other operations are performed on the part while the part is held in a precise fixed position.

One such precision locating apparatus or unit which has been used in the manufacture of vehicle bodies and body panels is produced by Fanuc Robotics North America, Inc. and sold under the trademark FLEXTOOL. The construction of such a programmable positioner is disclosed in U.S. Pat. No. 6,425,177. Another type of programmable positioner is sold by General Motors Corporation under the trademark PAAS. This positioner is capable of five different types of articulation. That is, the entire unit may move horizontally, vertically and rotate about a vertical axis. The tooling attachment may also be rotated around both vertical and horizontal axes. The positioner is also marketed by Fanuc Robotics North America, Inc. under the trademark C-FLEX.

The programmable positioners described above are commonly positioned under a linear part conveyor and thus require an elevated part conveyor which is relatively expensive to construct and maintain in comparison to a less expensive power roll bed conveyor or other low cost part handling device located on the floor. The programmable positioners described above are also complex in construction and are limited in their lifting capacity. It has also been found desirable for the programmable positioners to avoid the use of fluid cylinders such as air and hydraulic cylinders and the associated equipment for producing and supplying pressurized air or pressurized hydraulic fluid.

In general, programmable precision locating units are especially desirable in the manufacture of motor vehicle parts such as underbody panels or complete vehicle bodies so that different styles or types of body panels or complete bodies may be produced on the same manufacturing line. That is, the units provide for quickly relocating precision locating pin and clamp devices for engaging locating holes within the different body panels or complete bodies being conveyed along the manufacturing line.

Usually, a plurality of the precision locating units supporting corresponding locating pins and clamp devices are positioned under a body panel or complete body supported by the conveyor. The units are simultaneously operated to elevate the locating pins to engage corresponding holes within the panel or body. The units then lift the body or body panel up from the conveyor to a position where the panels and any parts to be added are clamped together, after which robotic spot welders weld the panel and parts together. At a down stream work station or cell along the part conveyor, another group of the precision locating units may be used for additional spot welding of the parts. The units are also used at a work station or cell for body framing where the underbody panels are joined with body parts such as side frames, inner and outer quarter panels, roof bows which are brought together for spot welding in order to form a complete vehicle body.

SUMMARY OF THE INVENTION

The present invention is directed to an improved positioning apparatus which is ideally suited for use adjacent or outboard of a linear conveyor line for manufacturing motor vehicle bodies or body parts such as underbody panels and complete vehicle bodies. The apparatus is capable of locating and lifting heavy body parts from a conveyor line to a precise elevated position above the line where parts are joined together, for example, by spot-welding. The positioning apparatus of the invention thus provides for using a low profile roll bed conveyor for moving the parts or components from work station to work station or from cell to cell. The apparatus of the invention is not only capable of lifting parts having substantial weight but also quickly and precisely positions or locates each part for the manufacturing or welding operation. The apparatus of the invention is entirely electrically operated and provides for a long service life with dependable operation.

In accordance with a preferred embodiment of the invention, a base member supports a tower member for horizontal linear movement, the tower member supports a carriage member for vertical movement, and the carriage member supports a horizontal lift arm member for horizontal movement so that the arm member is moveable along three separate X, Y & Z axes. All of the movable members are supported by linear bearings mounted on elongated guide rails, and each member is precisely moved by a corresponding elongated and flexible reinforced timing or gear belt which extends around a drive gear and an idler gear and is attached to the member. Each of the drive gears is driven by a servo-controlled electric motor through a gear reducer, and the motor shaft also drives absolute resolver unit and is connected to a spring set electrically actuated brake. In the preferred embodiment, the outer end portion of the horizontal arm carries a precision locating and clamp unit which is commonly used for engaging a motor vehicle body or body panel.

Other features and advantages of the invention will be apparent from the following description, the accompanying drawings and the appended claims.

DESCRIPTION OF THE PREFERRED EMBODIMENT

Figure 1:
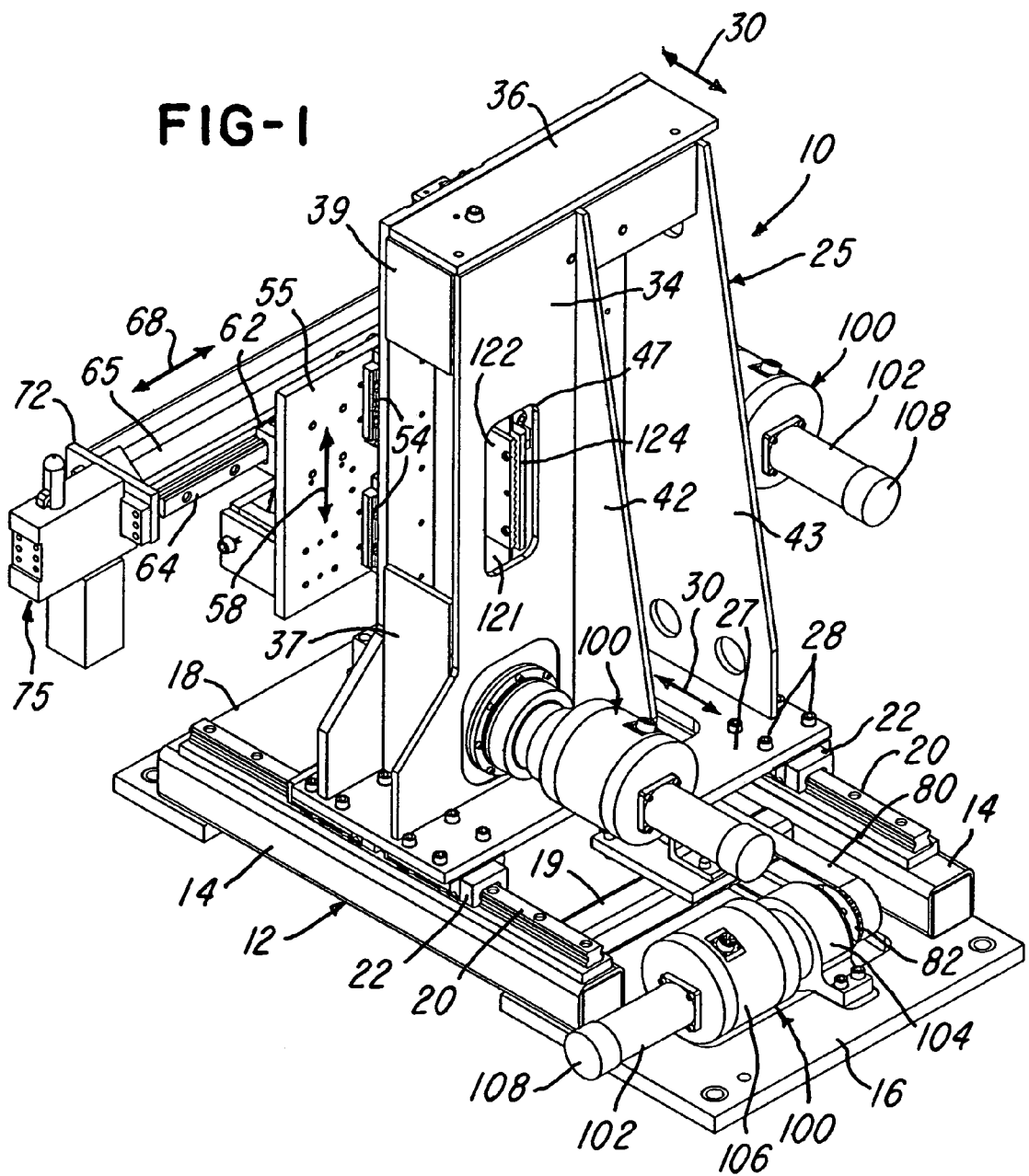
FIG. 1 is a perspective view of precision positioning apparatus or unit constructed in accordance with the invention.
Figure 2:
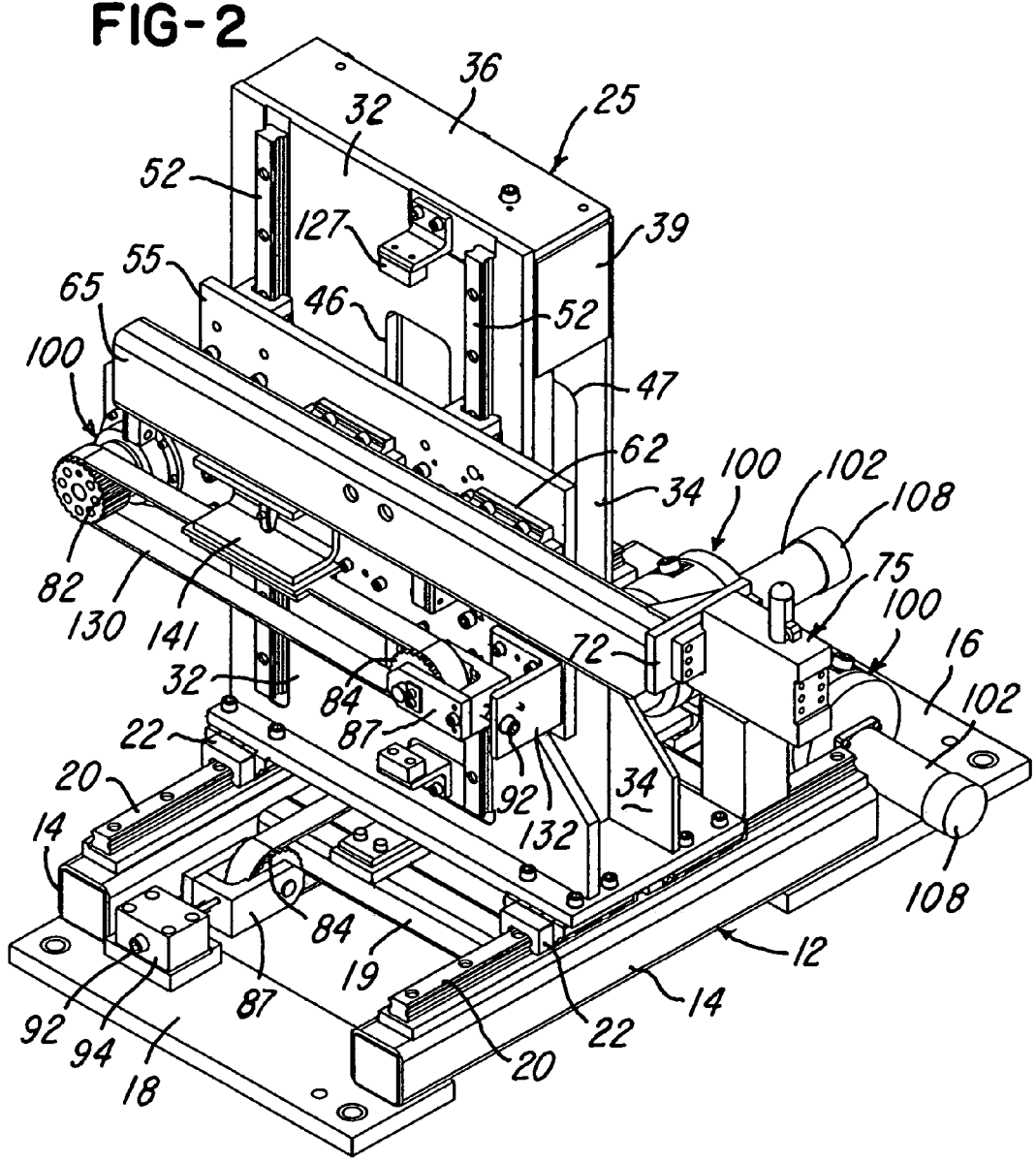
FIG. 2 is another perspective view of the apparatus or unit shown in FIG. 1.

FIGS. 1–4 show a precision positioning apparatus or assembly 10 constructed in accordance with the invention and which includes a steel base frame 12 fabricated with parallel spaced and horizontal tubular frame members 14 having opposite end portions rigidly connected by bottom base plates 16 and 18 and two cross members 19. An elongated precision guide rail 20 is secured to the top of each frame member 14, and each guide rail 20 receives and supports a pair of anti-friction linear bearing blocks 22. A fabricated steel tower 25 includes a base plate 27 secured to the top of the four linear bearings 22 by a series of bolts or machine screws 28 so that the tower 25 moves horizontally on the guide rails 20 along a precision linear X-axis 30.

The fabricated tower 25 includes a front wall or plate 32 (FIG. 3) and a rear vertical wall or plate 34 rigidly connected by a top wall or plate 36 and edge or side walls 37 and 39. The front wall 32 and rear wall 34 of the carriage 25 are also rigidly connected by a trapezoid-shaped wall 42, and a similarly shaped wall or plate 43 rigidly connects the front wall 32 to the top wall 36 and to the tower base plate 27. The front wall 32 has a vertically extending rectangular opening or slot 46 (FIG. 3), and the rear wall or plate 34 has a rectangular opening 47. A pair of vertical linear guide rails 52 (FIG. 3) are mounted on the front wall 32 of the tower 25, and each guide rail 52 supports a pair of vertically spaced anti-friction bearing pads or blocks 54. A vertical carriage member or plate 55 is secured to the four bearing blocks 54 so that the carriage plate has precision vertical movement along a vertical Z-axis 58.

Figure 4:
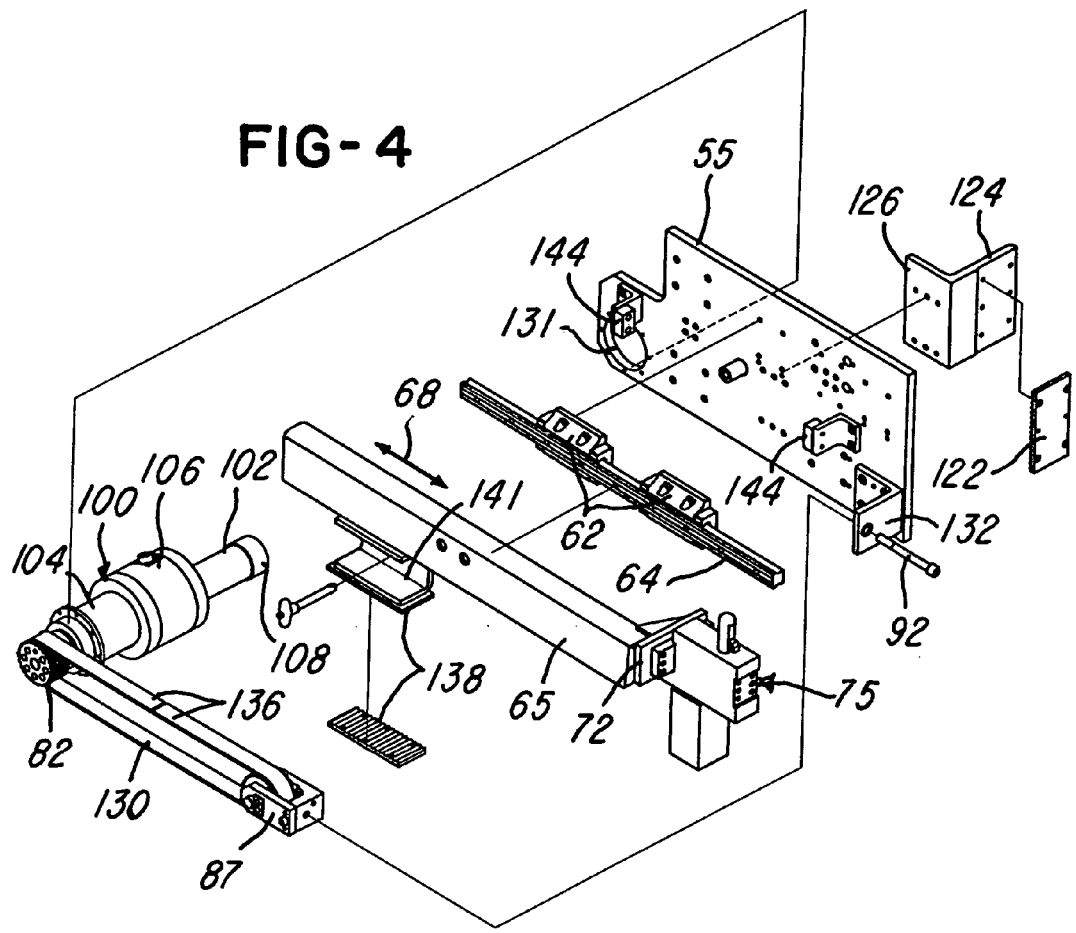

Referring to FIG. 4, a pair of horizontally spaced anti-friction linear bearing blocks 62 are rigidly secured to the front face of the carriage plate 55 and support an elongated guide rail 64 which is constructed the same as the guide rails 20 and 52. An elongated horizontal arm 65 of tubular steel is secured to the horizontal rail 64 and is supported by the bearing blocks 62 for precision horizontal movement along a Y-axis 68. The arm 65 has an outer end portion 72 which supports and carries a precision locator pin and clamp device 75, commonly referred to as a PLP device. One form of PLP device 75 which is used for locating and clamping a vehicle part or underbody panel is the Underbody Clamp Model K 60 UZ manufactured by Tünkers Maschinenbau GmbH and sold under the trademark TÜNKERS.

Figure 3:
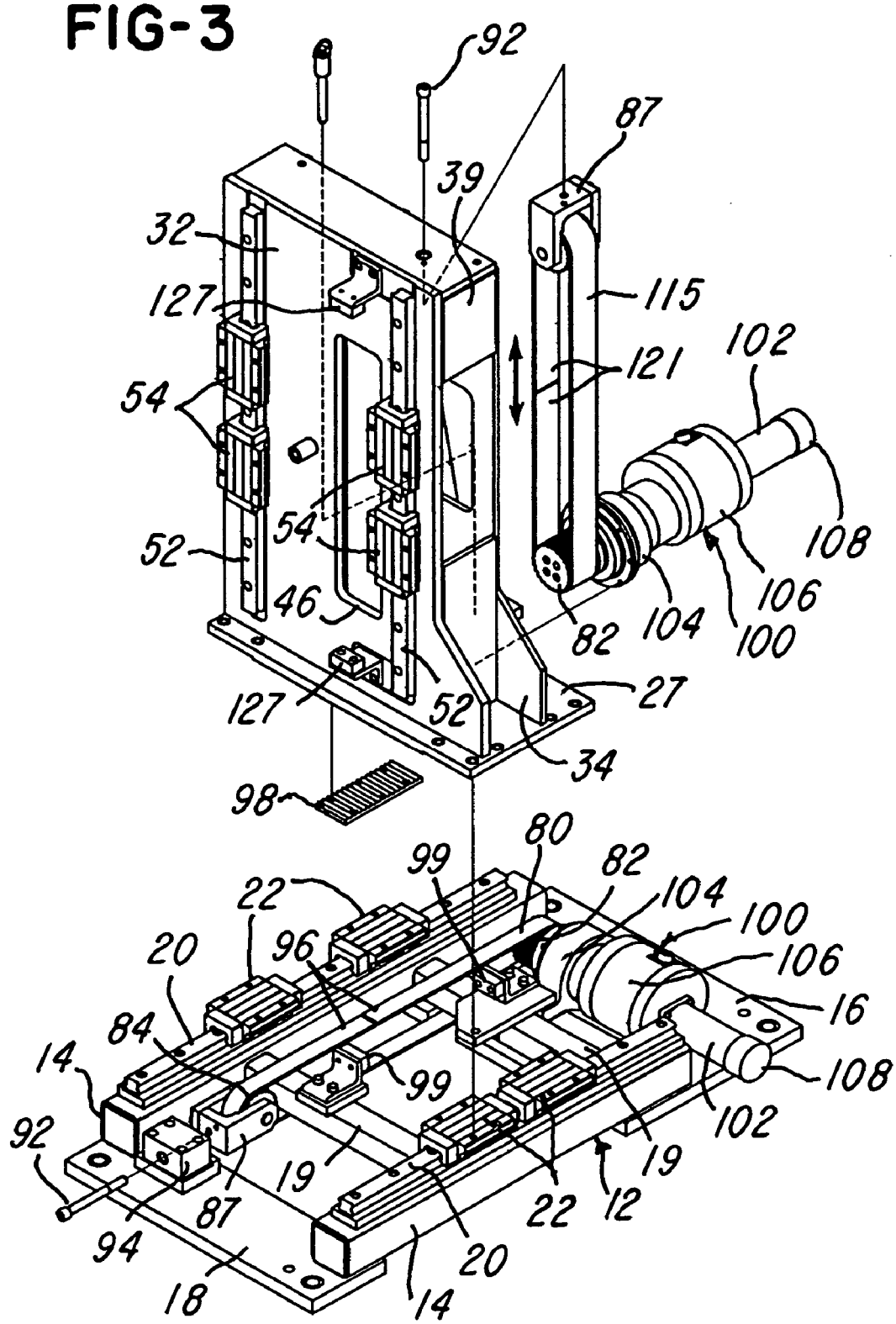
FIGS. 3 & 4 are exploded perspective views of the apparatus shown in FIGS. 1 & 2.

Referring to FIG. 3, the tower 25 is moved back and forth on the guide rails 20 and along the X-axis 30 by an elongated flexible reinforced timing belt 80 having longitudinally spaced teeth. The belt is directed around a drive sprocket or gear 82 and an idler sprocket or gear 84 supported by a U-shaped bracket 87. The timing or gear belt 80 is reinforced by internal steel cables, and the tension in the belt is adjusted by a tensioning screw of bolt 92 threaded through a stationary block 94 and rotatably connected to the U-shaped bracket 87. The belt 80 has opposite end portions 96 (FIG. 3) which are secured to the bottom of the base plate 27 of the tower 25 by a set of belt clamping plates 98 bolted to the bottom of the tower 25. The limits of travel of the tower 25 is determined by a set of end stops 99 mounted on cross members 19 of the base frame 12.

The drive sprocket or gear 82 is driven in opposite directions by a reversible drive unit 100 which includes a servo-controlled reversible 24 volt D.C. electric motor 102 having an output shaft connected to the input shaft of a two stage planetary gear reducer 104 having an output shaft supporting the drive gear 82. The output shaft extends through a dual 12 bit absolute resolver unit 106, and an opposite end portion of the shaft of the motor 102 connects with a spring set and electrically actuated parking brake 108. One of the resolvers in the resolver unit 106 keeps track of the number of complete shaft rotations while the other or second resolver provides 4,096 bit counts per shaft revolution. The 4,096 counts per revolution results in each count corresponding to 0.0002" of movement of the tower 25 and provides a closed loop feedback control from the main control panel for the positioning apparatus 10.

As also shown in FIG. 3, a vertically extending timing or gear belt 115 has longitudinally spaced teeth and is constructed the same as the timing belt 80. The belt 80 extends around another corresponding drive sprocket or gear 82 driven by another drive unit 100 mounted in a cantilevered manner on the rear wall 34 of the tower 25. The timing belt 115 is located within the tower 25 with the walls 32, 34, 37, 39 and 42 forming a housing for the belt. The upper end portion of the belt 115 extends around another corresponding idler sprocket or gear 84 which is supported by a U-shaped bracket 87 adjustably connected to the top wall 36 of the tower 25 by a belt tensioning screw or bolt 92. Referring to FIGS. 1 & 4, the opposite end portions 121 of the gear belt 115 are clamped between a set of belt clamping plates 122 and 124. The L-shaped plate 124 projects through the opening 46 and has a flange 126 secured to the rear surface of the carriage plate 55. Thus operation of the drive unit 100 for the gear belt 115 produces precision vertical movement of the carriage plate 55 on the tower 25 within predetermined limits as determined by end stop blocks 127 which engage opposite sides of the plate 124.

Referring to FIG. 4, another flexible gear or timing belt 130 is constructed the same as the belt 80 and extends horizontally between a drive sprocket or gear 82 and an idler sprocket or gear 84. The drive sprocket 82 for the belt 130 is driven by another drive unit 100 which is mounted within a bore 131 in an end portion of the carriage plate 55. The idler gear 84 for the belt 130 is supported by a corresponding U-shaped bracket 87 which is adjusted horizontally by a belt tensioning bolt 92 extending through an angle bracket 132 mounted on the opposite end portion of the carriage plate 55. The timing belt 130 has opposite end portions 136 which are connected to the bottom of the lift arm 65 by a pair of belt clamping plates 138 and a U-shaped bracket 141 which secures the upper plate 138 to the arm 65. Thus precision horizontal movement of the lift arm 65 on the Y-axis 68 is controlled by another corresponding drive unit 100. The limits of movement of the arm 65 are determined by a pair of end stop blocks or stops 144 (FIG. 4) which engage opposite ends of the bracket 141.

In operation of the precision positioning apparatus or unit 10, it is apparent that the drive unit 100 mounted on the base plate 16 controls the precision horizontal movement of the tower 25 along the guide rails 20 or X-axis 30, and that the operation of the drive unit 100 mounted on the tower 25 controls the precision vertical movement of the carriage member or plate 55 and lift arm 65 along the vertical guide rails 52 or Z-axis 58. The drive unit 100 mounted on the carriage plate 55 controls the precision horizontal linear movement of the arm 65 and the guide rail 64 within the linear bearing blocks 62 and on the Y-axis 68. This coordinated and independent movement of the arm 65 provides for precisely positioning a device such as the precision locator pin and clamp device 75 located laterally outboard of the base frame 12.

Figure 5:
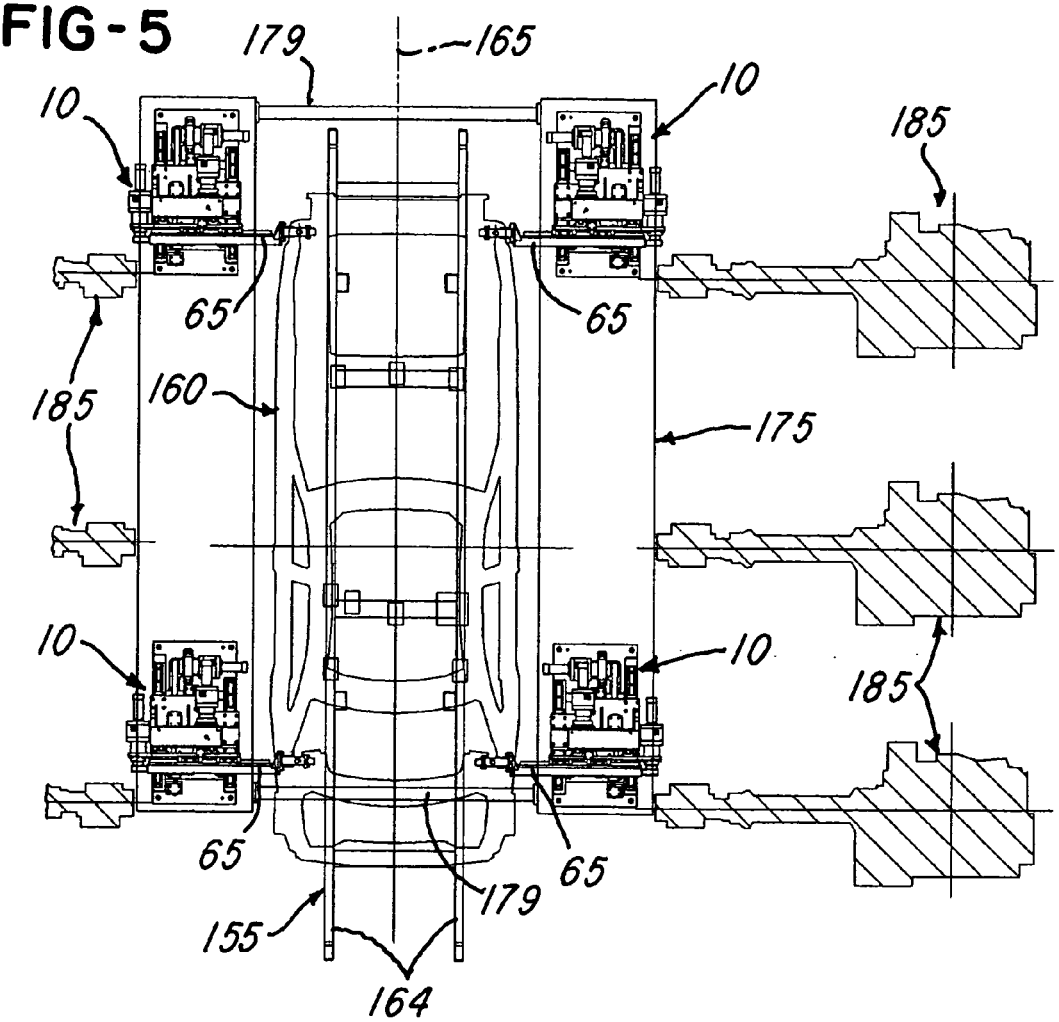
FIG. 5 is a diagrammatic plan view of a work station or cell for an automobile body production line and showing four of the positioning apparatus or units shown in FIGS. 1–4 and located at the corners of the cell.
Figure 6:
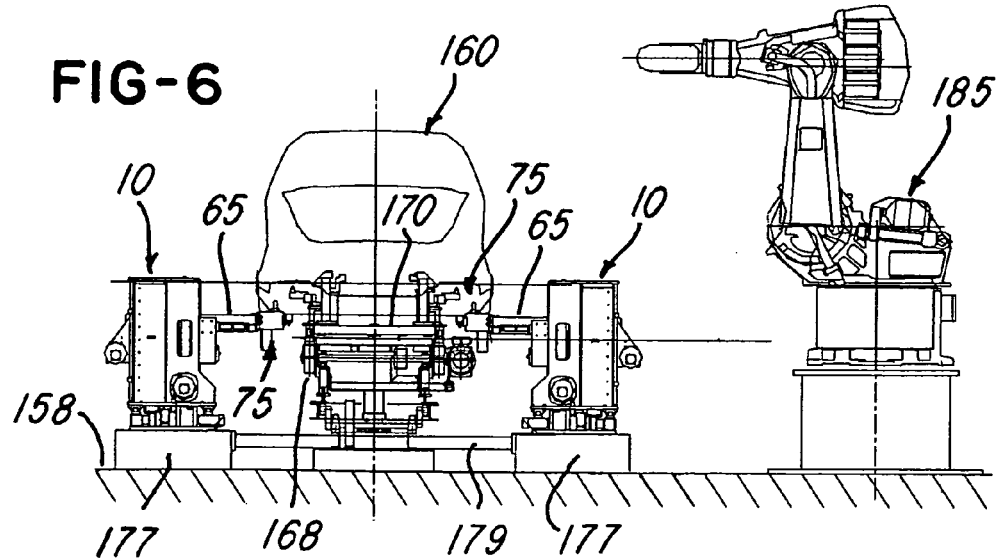
FIG. 6 is an elevational view of the work cell shown in FIG. 5 with a conventional robotic spot welding unit used at the work cell.

Referring to FIGS. 5 & 6, a power roll bed linear conveyor 155 is mounted on a floor 158 for conveying a series of parts, such as, for example, an automobile body 160, along a manufacturing line where each part receives multiple operations such as clamping and spot welding of body parts together. The conveyor 155 has parallel spaced horizontal rails 164 and a center line 165. A carrier 168 has wheels which engage the rails 164, and the carrier 168 supports a pallet 170 which is made to support the body 160. As illustrated in FIG. 5, the conveyor 155 extends through a work station or cell 175 having parallel spaced rectangular tooling pads or bases 177 supporting four of the positioning apparatus or units 10 at the corners of the work cell. The tooling bases 177 are rigidly connected together by cross members 179, and the positioning units 10 are precisely located on the bases 177 with the corresponding arms 65 projecting inwardly in generally opposing relation.

When a body part or body 160 arrives at the work cell 175, the positioning units 10 are simultaneously controlled along the X, Y & Z-axes until the locating pin and clamp devices 75 are precisely positioned at pounce positions under corresponding holes within the bottom of the body 160. The positioning units 10 are then simultaneously actuated for raising the lift arms 65 and devices 75 to engage and clamp the body 160 and lift the body from its supporting pallet 170. After the body 160 is elevated to a predetermined precise position, a plurality of spot welding operations are performed on the body by the welding robots 185. After the spot welding operations, the positioning units 10 are actuated to lower the arms 65 and locator devices 75 until the body 160 again seats on its pallet 170. The vehicle body 160 is then advanced or transferred by the conveyor 155 to the next work station or cell.

From the drawings and the above description, it is apparent that the positioning apparatus 10 constructed in accordance with the invention provided desirable features and advantages. For example, the three axes drive units 100 are controlled by controlling the three servo-controlled electric motors 102 with the feedbacks supplied by the resolver units 106, and the motor shafts are precisely stopped by the parking brakes 108. The drive units 100 cooperate with the corresponding gear belts 80, 115 and 130 for precisely and quickly positioning the arm 65 and locator pin device 75. The vertical gear belt 115 and corresponding drive unit 100 are also capable of providing substantial lifting force to the carriage plate 55 and arm 65 so that the locating pin device 75 is able to lift a part or body 160 having substantial weight.

As illustrated in FIGS. 5 & 6, the positioning units 10 are located laterally outboard of the power roll bed conveyor 155 so that the conveyor may be mounted on the floor and does not have to be elevated for locating positioning devices under the conveyor. The pretension and preloaded gear belts 80, 115 and 130 also eliminate any inaccuracies due to backlash which is a common problem when racks and gears or ball screws are used for moving positioning components. The gear belts are also resistant to ash which is generated in the surrounding environment by the spot welding operations. The positioning unit 10 is also operated entirely by electric and requires no air or hydraulic cylinders and the corresponding fluid supplies. In addition, the dual 12 bit absolute resolver units 106 provide for very high position resolution for precisely and quickly positioning the arm 65 and locator pin device 75. Thus a plurality of units 10 at a work station 175 may be quickly adjusted to accommodate different vehicle bodies or body parts on the conveyor 155.

While the form of positioning apparatus herein described constitutes a preferred embodiment of the invention, it is to be understood that the invention is not limited to this precise form of apparatus, and that changes may be made therein without departing from the scope and spirit of the invention as defined in the appended claims.

What is claimed is:

1. A positioning apparatus adapted to be installed outboard of a linear part conveyor for lifting and rigidly positioning a part above the conveyor at a work station, said apparatus comprising a base member supporting a tower member for horizontal linear movement, a carriage member supported by said tower member for vertical linear movement, a generally horizontal elongated arm member supported by said carriage member for horizontal linear movement perpendicular to said linear movement of said tower member and between a horizontally extended position and a retracted position, a first elongated flexible gear belt connected to move said tower member horizontally on said base member, a second elongated flexible gear belt connected to move said carriage member vertically on said tower member, a third elongated flexible gear belt connected to move said arm member horizontally relative to said carriage member, a corresponding idler gear engaging each of said gear belts, and a separate reversible electric motor drive unit for each of said gear belts and having a drive gear engaging a corresponding of said gear belts.

2. The apparatus as defined in claim 1 wherein at least one of said electric motor drive units comprises a gear reducer driven by a servo-controlled electric motor.

3. The apparatus as defined in claim 2 wherein said one electric motor drive unit includes an absolute resolver connected to a shaft of the corresponding electric motor and providing an electrical feedback of counts per each revolution of said shaft.

4. The apparatus as defined in claim 2 wherein said one electric motor drive unit includes a spring set electrically actuated brake connected to brake the corresponding said shaft of said electric motor.

5. The apparatus as defined in claim 1 and including a precision locator pin device supported by an outer end portion of said arm member.

6. The apparatus as defined in claim 1 wherein said tower member is supported for said linear movement by a set of parallel spaced horizontal guide rails mounted on said base member, and a set of linear bearings mounted on said tower member and engaging said guide rails.

7. The apparatus as defined in claim 1 wherein said carriage member is supported for said vertical linear movement by a set of parallel spaced vertical guide rails mounted on said tower member, and a set of linear bearings mounted on said carriage member and engaging said guide rails.

8. The apparatus as defined in claim 1 wherein said arm member is supported by a set of horizontally spaced linear bearings mounted on said carriage member, and an elongated horizontal guide rail secured to said arm member and engaging said linear bearings on said carriage member.

9. The apparatus as defined in claim 1 wherein each of said flexible gear belts includes a reinforced flexible gear belt having opposite end portions, and a set of clamping blocks securing said end portions of the corresponding said belt to the corresponding said tower member, carriage member and arm member.

10. The apparatus as defined in claim 1 wherein said tower member comprises a housing enclosing said gear belt, idler gear and drive gear for moving said carriage member.

11. A plurality of at least two of said apparatus each as defined in claim 1 and in combination with a horizontally extending conveyor adapted to support the part for movement along a horizontal linear path, and said apparatus are disposed laterally adjacent opposite sides of said conveyor with the corresponding said arm members projecting laterally inwardly of said conveyor in generally opposing relation.

12. A plurality of at least four of said apparatus each as defined in claim 1 and in combination with a horizontally extending elongated conveyor adapted to support the part for movement along a horizontal linear path, and said apparatus are disposed laterally adjacent opposite sides of said power conveyor with corresponding said arm members projecting laterally inwardly of said conveyor in generally opposing relation.

13. A positioning apparatus adapted to be installed outboard of a linear part conveyor for lifting and rigidly positioning a part above the conveyor at a work station, said apparatus comprising a base member having parallel spaced horizontal guide rails, a tower member having a bottom portion supporting a plurality of linear bearing blocks mounted on said horizontal guide rails for horizontal linear movement, parallel spaced vertical guide rails mounted on said tower member, a carriage member having a plurality of linear bearing blocks mounted on said vertical guide rails for vertical linear movement, a generally horizontal elongated arm member having a horizontal guide rail, linear bearing blocks mounted on said carriage member and engaging said guide rail on said arm member to provide for horizontal linear movement of said arm member perpendicular to said linear movement of said tower member and between a horizontally extended position and a retracted position, a first elongated flexible gear belt extending horizontally and connected to move said tower member horizontally on said base member, a second elongated flexible gear belt extending vertically and connected to move said carriage member vertically on said tower member, a third elongated flexible gear belt extending horizontally and connected to move said arm member horizontally relative to said carriage member, a corresponding adjustable idler gear engaging each of said gear belts, and a separate reversible electric motor drive unit for each of said gear belts and having a drive gear engaging a corresponding of said gear belts.

14. The apparatus as defined in claim 13 wherein each of said electric motor drive units comprises a gear reducer driven by a servo-controlled electric motor.

15. The apparatus as defined in claim 14 wherein each of said electric motor drive units includes an absolute resolver connected to a shaft of the corresponding electric motor and providing an electrical feedback of counts per each revolution of said shaft.

16. The apparatus as defined in claim 14 wherein each of said electric motor drive units includes a spring set electrically actuated brake connected to brake the corresponding said shaft of said electric motor.

17. The apparatus as defined in claim 13 and including a precision locator pin device supported by an outer end portion of said arm member.

18. The apparatus as defined in claim 13 wherein each of said flexible gear belts includes a reinforced flexible gear belt having opposite end portions, and clamping blocks securing said end portions of each said belt to the corresponding said tower member, carriage member and arm member.

19. The apparatus as defined in claim 13 wherein said tower member comprises a housing enclosing said vertically extending gear belt, idler gear and drive gear for moving said carriage member.

20. A plurality of at least four of said apparatus each as defined in claim 13 and in combination with a horizontally extending elongated conveyor adapted to support the part for movement along a horizontal linear path, and said plurality of apparatus are disposed laterally adjacent opposite sides of said power conveyor with corresponding said arm members projecting laterally inwardly of said conveyor.

* * * * *